(12) United States Patent
Nozu et al.

(10) Patent No.: US 6,617,830 B2
(45) Date of Patent: Sep. 9, 2003

(54) CAPACITOR SYSTEM FOR A VEHICLE

(75) Inventors: Ryutaro Nozu, Chiba (JP); Hisayoshi Mori, Tokyo (JP); Takaya Sato, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 10/144,227

(22) Filed: May 10, 2002

(65) Prior Publication Data

US 2002/0167297 A1 Nov. 14, 2002

(30) Foreign Application Priority Data

May 10, 2001 (JP) ........................................ 2001-140449

(51) Int. Cl.[7] ................................................ H01M 1/46
(52) U.S. Cl. ........................................ 320/166; 307/109
(58) Field of Search ................................. 320/103, 104, 320/128, 133, 137, 166, 167; 307/109, 110

(56) References Cited

U.S. PATENT DOCUMENTS 4,638,407 A * 1/1987 Lundsgaard
6,306,509 B2 * 10/2001 Takeuchi et al.
2003/0058667 A1 * 3/2003 Suzuki et al.

* cited by examiner

Primary Examiner—Edward H. Tso
(74) Attorney, Agent, or Firm—Seed IP Law Group PLLC

(57) ABSTRACT

A capacitor system suitable for charging and discharging of a vehicle such as discharging due to starting of an engine, charging by an alternator, and recharging upon braking. The capacitor system can be a vehicle power source having several connected cells in which ion conductive materials are arranged between a pair of electrode structures with large surface area materials and an electric double layer is formed between the large surface area materials in the electrode structure and an electrolyte of the ion conductive materials. Charging and discharging are controlled for state of charge of the capacitor unit with several connected modules to be within a predetermined range. A minimum charge within the predetermined range is sufficient for the engine to start while a maximum charge within the predetermined range is within a rated voltage of the capacitor unit with several connected modules.

12 Claims, 8 Drawing Sheets

CAPACITOR SYSTEM FOR A VEHICLE

BACKGROUND OF THE INVENTION

1. Field of the Invention

This invention relates to a capacitor system for a 12V vehicle, a 42V vehicle, an electric vehicle, or a hybrid powered vehicle, all designed to offer highly improved energy efficiency.

2. Description of the Related Art

As a conventional electric capacitor device for a vehicle, the 12V vehicle employs a lead battery while the hybrid powered vehicle employs a nickel metal hydride battery. The former with the lead battery discharges only when under about 100 percent state of charge, an engine is started or is being stopped with light-load, and the latter with the nickel metal hydride storage battery controls, under 20–80 percent state of charge, discharging, alternator charging, and recharging.

Among the conventional capacitor devices, lowering the state of charge of the lead storage battery generates large crystals of lead sulfate with low reversibility, which becomes a cause of increase in the internal resistance. Therefore, the conventional capacitor device is not suitable for a rechargeable system or is characterized in its extremely low durability even if it may be used for the rechargeable system.

All of the conventional capacitor devices have employed an aqueous solution type storage battery, wherein when the state of charge of the battery goes over 50 percent, a charging reaction and aqueous electrolysis of an electrode active substance simultaneously occur with a reintegration reaction of gaseous oxygen generated from a positive electrode, which lowers the charging efficiencies.

BRIEF SUMMARY OF THE INVENTION

Aspects of the invention include a capacitor system for a vehicle with a power source discharging upon starting an engine, charging by an alternator, or recharging upon braking. The power source is a capacitor unit with several connected modules in which ion conductive materials are arranged between a pair of electrode structures with large surface area materials and an electric double layer is formed between the large surface area materials in the electrode structure and an electrolyte of the ion conductive materials, wherein charging and discharging are controlled for a state of charge of the capacitor unit with several connected modules to be within a predetermined range; and a minimum charge within the predetermined range is sufficient for the engine to start while a maximum charge within the predetermined range is within rated voltage of the capacitor unit with several connected modules.

Further aspects include a capacitor system for a vehicle as above, wherein if the state of charge of the capacitor unit with several connected modules becomes lower than a predetermined range, discharging other than for starting the engine is inhibited.

Further aspects include the capacitor system for a vehicle as above, wherein if a state of charge of the capacitor unit with several connected modules becomes higher than a predetermined range after conducting one recharging operation upon braking, any type of charging is inhibited; and if the state of charge of the capacitor unit with several connected modules becomes higher than the predetermined range after a predetermined number of recharging, alternator charging is inhibited and recharging only is conducted.

Further aspects include a capacitor system for a vehicle with a power source discharging upon starting an engine, charging by the alternator, or recharging upon braking. The power source is the capacitor unit with several connected modules in which ion conductive materials are arranged between a pair of electrode structures with large surface area materials and an electric double layer is formed between the large surface area materials in the electrode structure and an electrolyte of the ion conductive materials, wherein charging and discharging are controlled for a state of charge of the capacitor unit with several connected modules to be 50–99 percent provided that the state of charge of the capacitor unit with several connected modules at rated voltage is 100 percent.

Further aspects include the capacitor system for a vehicle as above, wherein if a state of charge of the capacitor unit with several connected modules becomes higher than 99 percent, any type of charging is inhibited; and if the state of charge of the capacitor unit with several connected modules is 90–99 percent, alternator charging is inhibited and recharging only is conducted.

Further aspects include the capacitor system for a vehicle as above, wherein the capacitor module with several connected cells is configured such that plural modules of electrical double layer capacitor cells are arranged in series. The respective bypass circuit is arranged between the modules; charging of one or more high-charged modules is interrupted by use of the bypass circuit; and state of charges of all modules are controlled to be equalized.

Further aspects include the capacitor system for a vehicle as above, wherein if irregularity in the state of charges among the modules becomes more than a predetermined range, charging of one or more high-charged modules is interrupted; and state of charges of all modules are controlled to be equalized.

Further aspects include the capacitor system for a vehicle as above, wherein a power terminal is extended from an electric double layer capacitor cell terminal and the power is directly driven therefrom.

BRIEF DESCRIPTION OF THE SEVERAL VIEWS OF THE DRAWING(S)

DETAILED DESCRIPTION OF THE INVENTION

Figure 1:
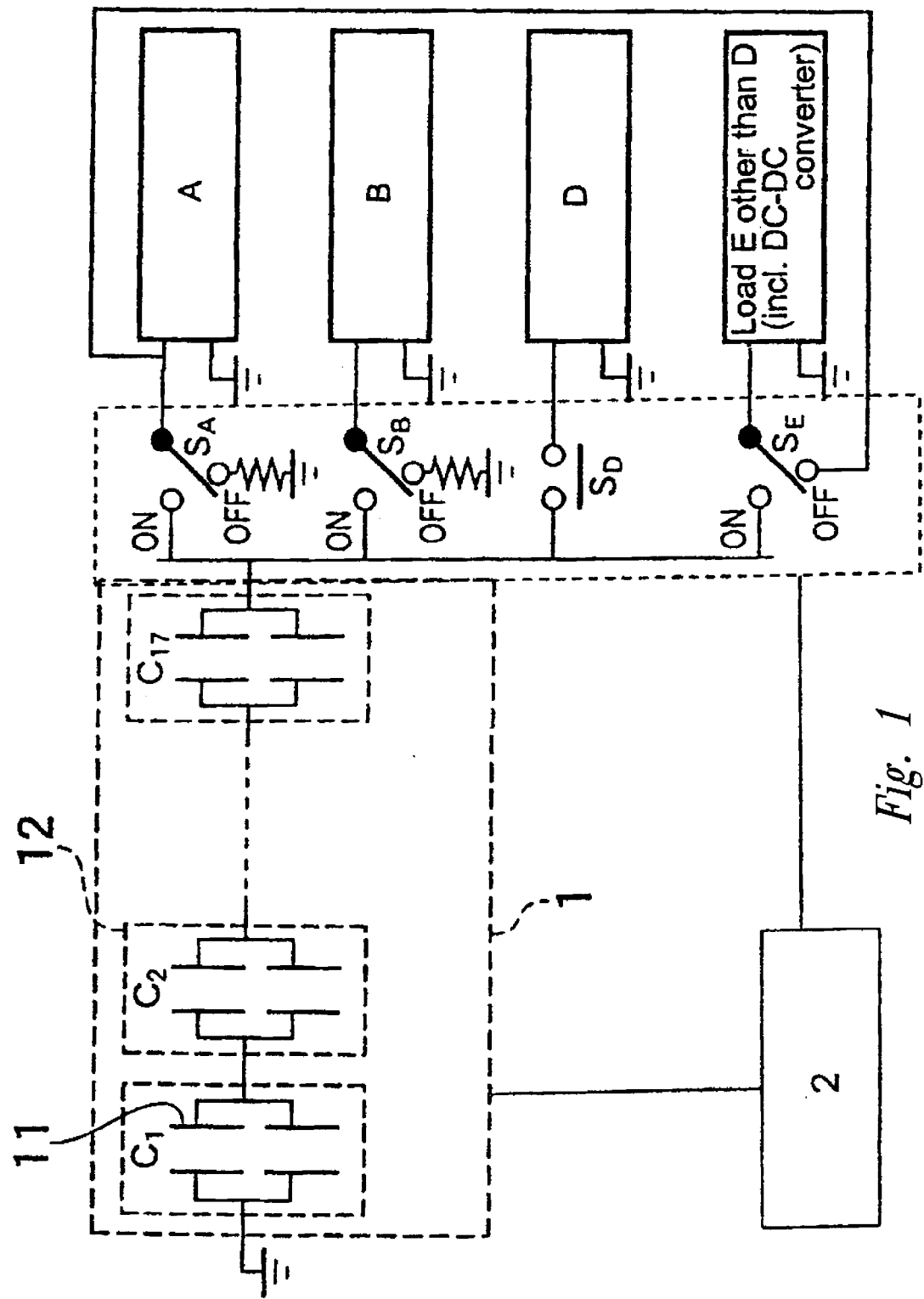
FIG. 1 is a circuit drawing of a capacitor system for a vehicle with a capacitor unit with several connected modules.

Implementations provide a capacitor system suitable for charging and discharging of a vehicle, especially for discharging due to starting of an engine, alternator charging, and recharging by braking. Implementations further provide a capacitor system for a vehicle with excellent durability.

In detail, implementations employ the electric double layer capacitor as a storage device for a vehicle in order to resolve the aforementioned problems. It is well-known that the electric double layer capacitor utilizing a polarizable electrode, mainly consisting of an activated carbon, and an organic electrolyte is such that the electrolyte theoretical decomposition voltage is to be 3V or more and that it provides excellent reversibility because of charging and discharging conducted by ion absorption-desorption unlike a device utilizing chemical reaction such as a secondary cell. A reaction speed relative to a discharging mechanism by way of the ion-desorption is much faster than other types of chemical reactions and shows an excellent voltage drop due to the reaction resistance relative to the large current discharging, thereby making it suitable for the engine start. Also, an electrode mainly including activated carbon with specific surface area of 1000 $m^2/g$ or more may be utilized giving more than sufficient charging of electric capacity for the vehicle.

The electric double layer capacitor cell utilizing ion conductive materials such as an organic electrolyte is characterized in that the difference between the voltage according to the ion-absorption and the voltage decomposed by electrolyte of side reaction is relatively larger compared to an aqueous solution type battery. Therefore, utilizing the fact that highly effective charging and discharging (the large quantity of charging and discharging) may be obtained under the state of charge at the rated voltage (100 percent state of charge), the electric double layer capacitor cell may be used from under the state of charge within a predetermined range, i.e., under the state of charge at the rated voltage (for example, 99 percent charging, a state slightly lower percentage for the safety concern) to under the state of charge necessary for starting the engine (for example, 50 percent state of charge) (since the voltage of the electric double layer capacitor cell varies rectilinearly with the state of charge).

Utilizing the electric double layer capacitor cell with such characteristics, the double layer capacitor cells are parallelly connected for the quantity of electricity necessary to start the engine (quantity of electricity consumed for starting the engine); and the parallelly connected cells may be connected in series for quantity necessary to start the engine without being fully charged (for example 50 percent state of charge) so as to compose the battery.

Relative to the battery, after detecting the terminal voltage of the whole battery or individual electrical double layer capacitor cell voltage, if the state of charge for example reaches 90 percent or more, signals inhibiting the charging from the alternator is transmitted; the charging is shut off; and if the state of charge reaches for example 99 percent or higher (i.e., the state of charge in consideration of the safety without exceeding 100 percent charging) after certain plural number of recharging from 90 percent signals inhibiting the recharging by braking is transmitted so as to shut off the charging. If the state of charge reaches any percentage that is lower than the range of 50–90 percent, discharging for other than starting the engine is inhibited upon transmitting the signals of such inhibition. Accordingly, the charging-discharging system is so constructed.

A switch bypassing capacitor modules is positioned between the capacitor modules arranged in series as above, the switch bypassing the module is controlled to be switched to inhibit the charging of the module if the state of charge of one module while being charged by the alternator reaches 90 percent and while recharging upon (by) braking reaches 99 percent.

A switch bypassing capacitor modules is positioned between the capacitor modules arranged in series as above, the switch bypassing the modules is controlled to be switched to inhibit the charging of the modules if the state of charge of plural modules while being charged by the alternator reaches 90 percent and while recharging upon (by) braking reaches 99 percent.

Providing a circuit adjusting the voltage to be the one necessary for discharging other than for a engine starter, such an electric power is driven from the circuit, thereby constructing the charging-discharging system adjusting the irregularity among the modules and maintaining the equality while conducing the above charging.

The embodiments of the invention are next described while referring to the accompanying drawings.

<A>vehicle capacitor system

A capacitor system for a vehicle is for a 12V vehicle, 42V vehicle, an electric vehicle, or a hybrid powered vehicle, which comprises a control unit 2 and a capacitor unit with several connected modules in series and/or in parallel 1 made in combination of electrical double layer capacitor cells (hereinafter, cells), at least capable of being charged by the alternator, recharged upon braking, discharged by starting engine, or charging and discharging by any other way. That is, the capacitor unit with several connected modules 1 may employ one type of charging and discharging means or plural types of charging and discharging means.

<B>Capacitor unit with several connected module

The capacitor module with several connected cells 1 is made in combination of cells arranging and connecting parallelly and in series. For example, as shown in FIG. 1, plural cells 11 are arranged and connected in series to form a module 12; and plural modules 12 ($C_1$–$C_{17}$) are arranged and connected in series.

This construction satisfies necessary conditions for a power supply of a vehicle, for example conditions of voltage and electric current relative to the engine start and other electric devices and a condition of charging by the alternator and recharging upon braking.

<C>Electrical double-layer capacitor

In an electrical double layer capacitor cell 11, ion conductive materials are arranged between a pair of electrode structures, and an electrical double layer is formed between materials with high surface area in the electrode structure and electrolyte of the ion conductive materials. Large surface area materials are powdery large surface area materials pulling many ions thereon, and it is preferable to use activated carbon, which can be obtained from carbon materials by steam activation method or by melted KOH activation process. For example palmae shell type activated carbon types, phenol type activated carbon, petroleum coke type activated carbon, and polyacene may be used as activated carbon. These materials may be used alone or in a combination of two types or more. Among those, because of a large electrostatic capacity, phenol type activated carbon, petroleum cokes type activated carbon, and polyacene are preferable <D>Structure for capacitor unit with several connected modules for a 42V vehicle As one example, if the capacitor unit with several connected modules for a 42V vehicle is configured by a cell under the rated voltage of 2.5V, quantity of electricity of 2000 mAh storeable under the rated voltage (electrostatic capacity of 2880 F), and internal resistance of 1.0 mΩ, the quantity of electricity necessary to start an engine is to be 70 mAh (assuming that it takes 1.0 second at rush current of 500 A to start an engine) and 2 cells are parallelly connected to be 4000 mAh i.e., about 60 times of the quantity necessary to start an engine. Further, 17 or 18 of those are connected in series to construct the capacitor unit with several connected modules for a 42V vehicle. At that time, the number of cells connected in series is to be "n", and the quantity of electricity under 100 percent state of charge is to be 2880× 42.0/n(mAh).

Formula 1 expresses the state of charge $SOC_{i,t}$ (t: certain time) (percent) when the current value while charging and discharging is I(A) (charging I>0, discharging I<0), assuming that the state of charge of the individual module (Ci) and the voltage $V_i$ (V) of the module are rectilinearly varied.

$$SOC_{i,t}=(V_i-1.0\times I/1000/(42.0/n)\times 100 \quad \text{Formula 1}$$

Figure 2:
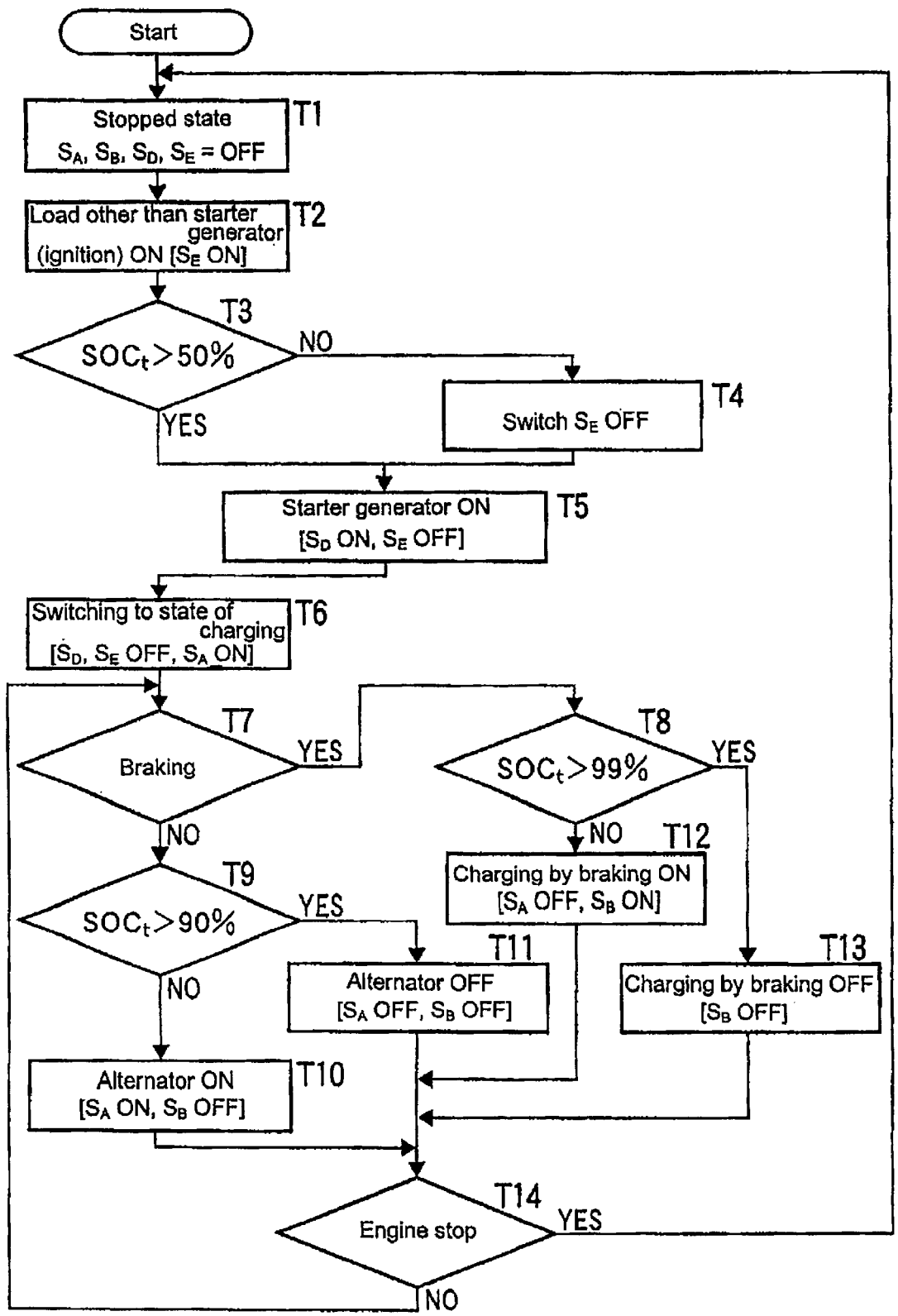
FIG. 2 is a flowchart of charging control for a capacitor system for a vehicle.

$SOC_{i,t}$: state of charge (percent) at certain time t of module Ci $V_i$: charging value (V) of module Ci I: current value of capacitor unit with several connected modules at charging and discharging n: number of cells of capacitor unit with several connected modules connected in series Similarly, FIG. 2 expresses state of charge $Q_t$ of entire capacitor unit with several connected modules $$SOC_t=(\Sigma V_i-1.0\times n\times I/1000)/42.0\times 100 \quad \text{Formula 2}$$

$SOC_t$: state of charge (percent) of capacitor unit with several connected modules at certain time t The capacitor system for a vehicle as shown in FIG. 1 comprises a capacitor unit with several connected modules 1 characterized in that the capacitor modules 12 ($C_1$–$C_{17}$) having 2 parallelly connected cells 11 are connected in series, the alternator A, the recharger B, the engine starter D, the load E other than the engine starter D, the switches $S_A$ and $S_B$, the A contact switch $S_D$, and the switch $S_B$.

<E>Charging-discharging control of capacitor unit with several connected modules The charging-discharging control is explained next with reference to FIG. 2. A control unit 2 determines and calculates the voltage/current and controls charging and discharging by using switches. When a vehicle is stopped, all switches $S_A$–$S_D$ are turned off (T1). Prior to the engine start, the switch $S_E$ is turned on while the switches $S_A$, $S_B$ are turned off at that time and the load other than the engine starter (e.g., ignition) is turned on (T12). Here, the state of charge $SOC_t$ of the capacitor unit with several connected module 1 at the certain time t is determined by measuring the voltage $V_i$ (V) of individual module ($C_i$) (wherein the respective voltmeter 21 connected to both ends of the respective module is electrically connected to the control unit 2 and the voltage $V_i$ is input in the control unit 2), the terminal voltage $\Sigma Vi$ (V) of the capacitor unit with several connected modules 1, and the current value I(A) running at that time (charging I>0, discharging I<0) (wherein an ammeter 22 connected between the capacitor unit with several connected modules 1 and an earth is electrically connected to the control unit 2 and the current I is input in the control unit 2). If $SOC_t$ is 50 percent or lower, the switch $S_E$ is turned off (T4); if $SOC_t$ is larger than 50 percent (T3), the switch $S_E$ is turned on. At that time, even if the engine starter is not operated, if $SOC_t$ is 50 percent or lower the switch $S_E$ is turned off (T4); if $SOC_t$ is 50 percent or large the switch $S_E$ is turned on.

The engine starter is operated (T5), and then the A contact switch $S_D$ and the switch $S_E$ are turned off (after starting the engine, electricity is supplied from the alternator $S_A$); and the switch $S_A$ is turned on to switch into the state of charge (T6).

If no braking is operated and the state of charge is more than 90 percent, the switch $S_A$ is turned off, thereby inhibiting the charging by the alternator. If the state of charge is not 90 percent or more, the switch $S_A$ is turned on to charge by the alternator, and the switch $S_B$ is turned off to cut off the recharging to the capacitor. If the braking is operated (T8) and the state of charge is not 99 percent or more, the switch $S_A$ is turned off while the switch $S_B$ is turned on to conduct recharging of the capacitor unit with several connected modules 1 (T12). If the state of charge is 99 percent, the switch $S_B$ is turned off to cut off the recharging to the capacitor. (T13). When the engine is being stopped, the system goes into the step T1, and when the engine is not being stopped, then the system goes into the step T7 to determine whether the braking is being conducted. Applying the above control system, the capacitor unit with several connected modules 1 is applied to a 42V vehicle. Utilizing the above structure and applying the above control prevents overcharging of the capacitor unit with several connected modules 1 to increase the durability of the capacitor module with several connected cells 1.

<F>Averaging the state of charge of each module

Figure 3:
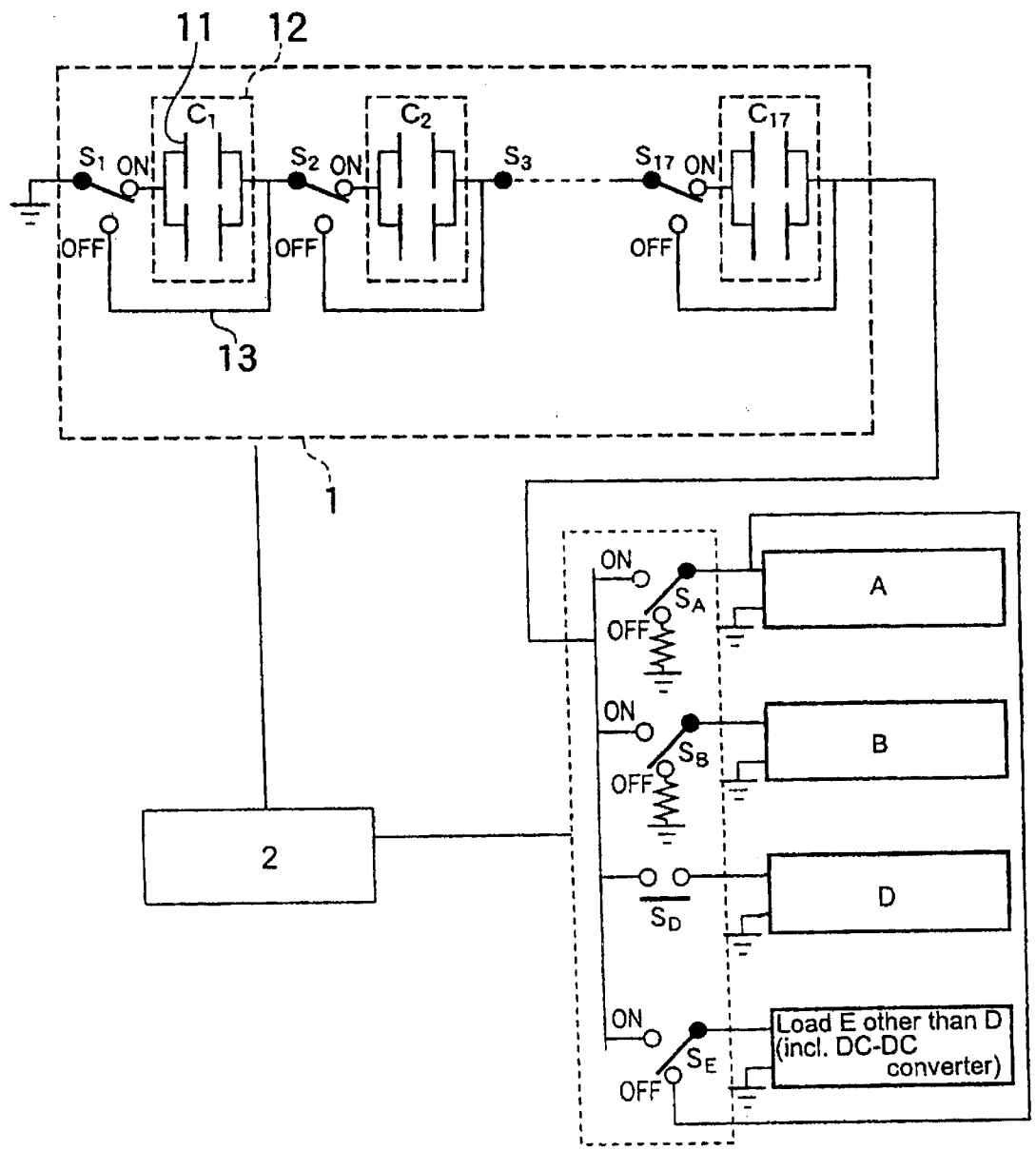
FIG. 3 is a circuit drawing of a capacitor unit with several connected modules with bypass circuits.
Figure 4:
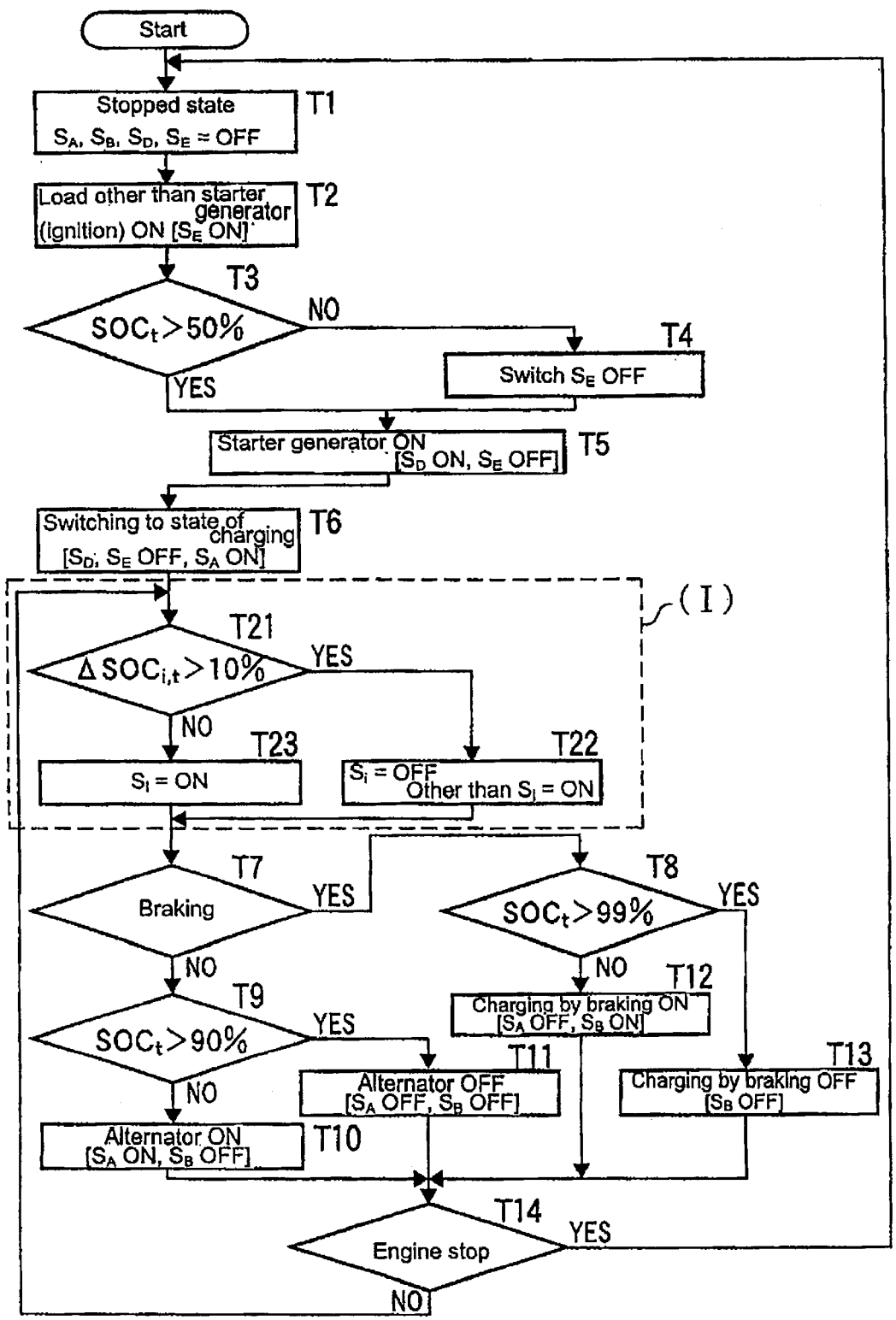
FIG. 4 is a flowchart of a process in reducing irregularity of the state of charge of the module.

The capacitor unit with several connected modules 1 comprises the switches $S_1$–$S_{17}$ and bypass circuits 13, each extended between the capacitor modules 12 utilizing the switches $S_1$–$S_{17}$ as shown in FIG. 3. Charging-discharging control of the capacitor unit with several connected modules 1 is explained with reference to FIG. 4. Here, an explanation to any step common to the steps in FIG. 2 will be omitted and additional steps (I) within a dashed line rectangular will be explained next.

In the circuit configuration of FIG. 3, when charging after starting the engine, every module voltage $V_i$ (V) measured at discharging (wherein the respective voltmeter 21 connected to both ends of the respective module is electrically connected to the control unit 2 and the voltage $V_i$ is input in the control unit 2) and the module $C_j$ currently being bypassed are recognized; and the electric current $I_i$ (A) running in the respective module (wherein an ammeter 22 connected between the capacitor unit with several connected modules 1 and an earth is electrically connected to the control unit 2 and the current I is input in the control unit 2) is to be $I_j$=0(A), and the electric current $C_i$=I(A) running in the module other than $C_j$ is determined. The state of charge $SOC_{i,t}$ (percentage) at certain time t is calculated in Formula 3.

$$SOC_{i,t}=(V_i-1.0\times I_i/1000/(42.0/n)\times 100 \quad \text{Formula 3}$$

$SOC_{i,t}$: state of charge (percent) of the module Ci at certain time t

If the module $C_k$ is maximum, Formula 4 expresses $SOC_{k,t}$ taking into consideration of the state of charge $SOC_{k,t}$ of the module $C_k$, the average value AM of the state of charge of the module other than $C_k$, the difference $\Delta SOC_{k,t}$ between the state of charge $SOC_{k,t}$ and the average value AM. Formula 5 expresses the average value AM of the state of charge of the module other than $C_k$. Formula 6 expresses the difference $\Delta SOC_{k,t}$ between the state of charge $SOC_{k,t}$ and the average value AM. (Here, "n" represents the number of modules, i.e., 17.)

$$SOC_{k,t} = (V_k - 1.0 \times I_k/1000)/(42.0/n) \times 100 \quad \text{Formula 4}$$

$SOC_{k,t}$: state of charge (percent) of the module Ck at certain time t $$AM = SOC_{k,t} = -\Sigma SOC_{i,t}/(n-1) \quad \text{Formula 5}$$

Here, $\Sigma$ gets the sum each suffix other than k.

AM: average value of the state of charge of the module other than $C_{k1}$ $$\Delta SOC_{k,t} = SOC_{k,t} - (\Sigma SOC_{i,t} - SOC_{k,t})/(n-1) \quad \text{Formula 6}$$

$\Delta SOC_{k,t}$: difference between $SOC_{k,t}$ and AM

After switching the state of charge at the steps T1–T6, if the difference $\Delta SOC_{k,t}$ between the maximum value of the state of charge of the respective module 12 and the average value of the state of charge of the module 12 other than the maximum value becomes more than 10 percent the switch $S_k$ bypassing the module 12 is turned off while the rest of the switches $S_i$ are turned on (T22) and the modules other than the module $C_k$ are to be chargeable. If the difference $\Delta SOC_{k,t}$ does not becomes 10 percent or more all the switches $S_i$ bypassing the module are turned on (T23), and all modules $C_i$ are to be chargeable. Then, when charging after starting the engine, the charging is conducted at the steps T7–T14. If the engine is not being stopped, the system goes into the step T21 and the charging control is repeated.

At the step T21, instead of determining the difference $\Delta SOC_{k,t}$ between the maximum module $SOC_{k,t}$ and AM, the difference $\Delta SOC_{i,t}$ between the respective module $SOC_{i,t}$ and average value $\Sigma(SOC_{i,t})/n$ of all of the modules may be determined and compared with 10% to go into the steps T22 and T23. At the step T21, instead of determining the difference $\Delta SOC_{k,t}$ between the maximum module $SOC_{k,t}$ and AM, a simple process of determining the module of the maximum $SOC_{k,t}$, turning the switch $S_k$ of the maximum module $C_k$ off and of turning the switches of the rest of the modules on (T22) to go into the step T7 may be employed.

Employing the above construction and control, equal charging is to be conducted to the respective module, and the charging and discharging are controlled accurately, thereby increasing the durability of the capacitor module with several connected cells 1. Although the difference $SOC_{k,t}$ (predetermined difference) is 10 percent in the above explanation, it may be selected as appropriate in consideration of types of vehicles, types of capacitor (combination) batteries and battery construction, since mutual state of charge of the module needs only to be equalized.

<G>Driving a power terminal from between the modules

Figure 5:
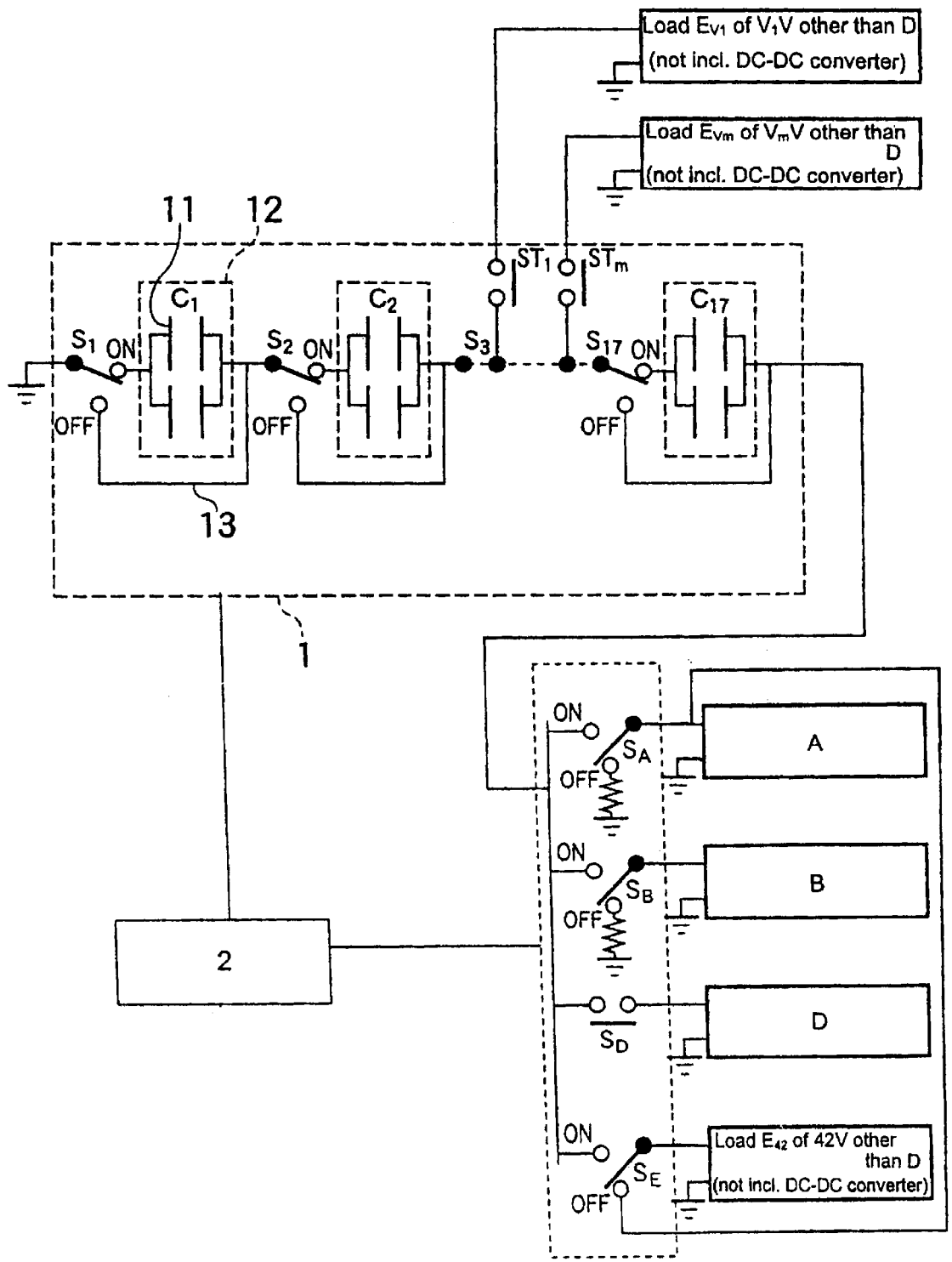
FIG. 5 is a circuit drawing of a capacitor module with several connected cells driving electric terminals from between modules.

As shown in FIG. 5, the load $E_{V1}$ driven by the voltage $V_1$ with the switch $ST_1$ and the load $E_{Vm}$ driven by the voltage $V_m$ (V) with the switch $ST_m$ constitute a capacitor and a circuit. Here, a capacitor side of the switch $ST_1$ is connected to $S_3$ so as that $V_1$ is to be 5(V); and a capacitor side of the switch $ST_m$ is connected to $S_6$ so that Vm is to be 12.5V(V), thereby constituting the capacitor unit with several connected modules 1. Accordingly, driving the power terminal (lead wire) from between the modules supplies necessary voltage without using a DC-DC converter.

Figure 6:
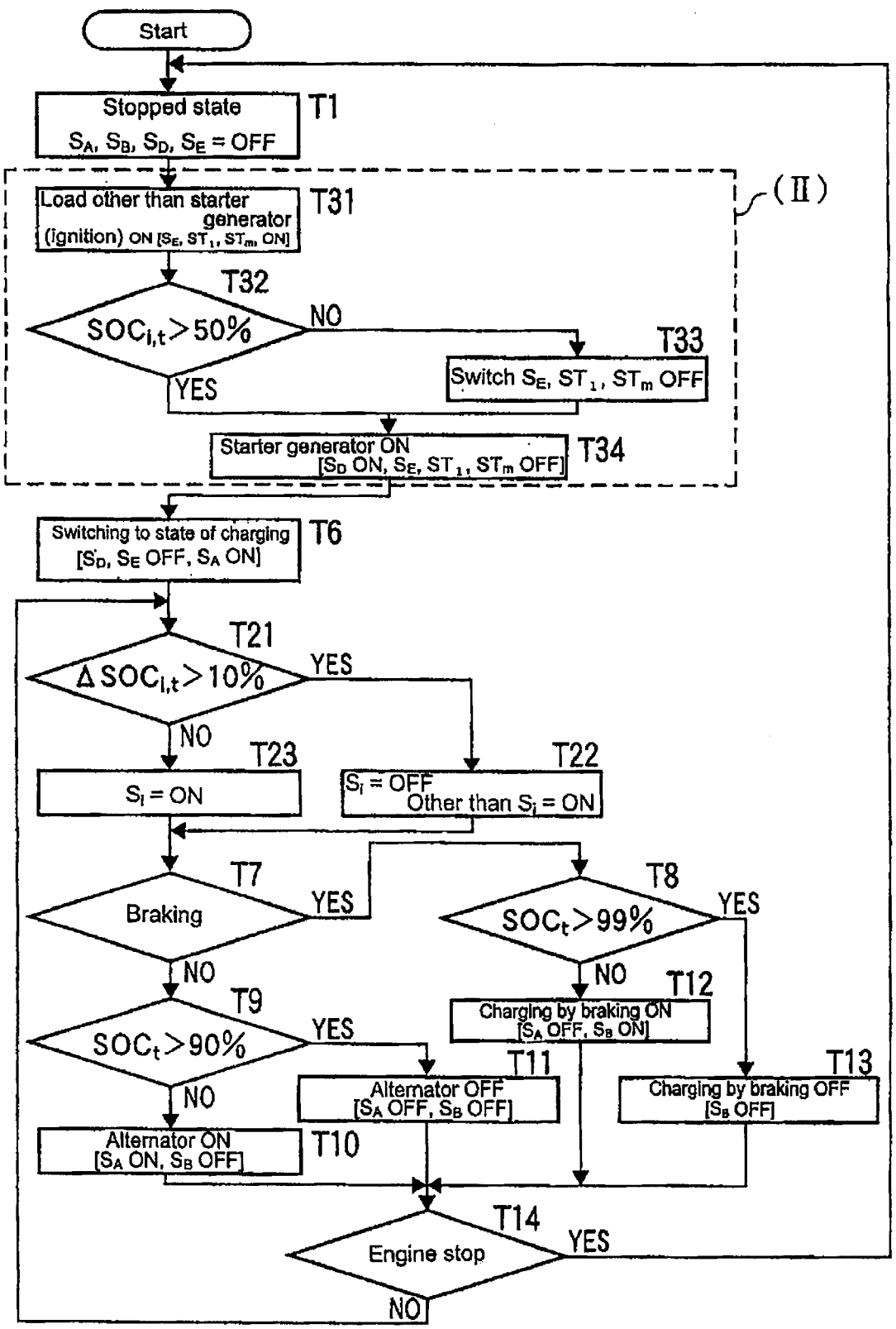
FIG. 6 is a circuit drawing of a charging control process for a capacitor module with several connected cells driving electric terminals from between modules.

The charging-discharging control of the capacitor unit with several connected modules in FIG. 5 (wherein the voltage/current measurement is similar to what was explained in FIG. 3) is explained next with reference to FIG. 6. Explanation as to common steps already described in FIGS. 2 and 4 will be omitted and the steps within a dashed rectangular line (II) in FIG. 6 will be explained. At the step T31, if the load other than the engine starter (i.e., ignition) is turned on, the switches $S_E$, $ST_1$ and $ST_m$ are turned on. Next, if the ignition is turned on prior to the engine start and if the state of charge $SOC_{i,}$ of any capacitor module Ci during the discharging such as the engine stop is 50 percent (T34), the switch $S_E$, $ST_1$, and $ST_m$ are turned off (T33) while if the state of charge $SOC_{i,t}$ is 50 percent or less, the switch $S_E$, $ST_1$ and $ST_m$ are turned off (T34), and then the system goes into the step T6.

<H>Experiment of charging efficiency

In order to test an efficiency of a conventional lead battery, Ni—MH battery and the capacitor unit with several connected modules of the present invention, they under the state of charge (SOC) of 0 percent were charged at about 1 hour rate electric current under 50 percent, 60 percent, 70 percent, 80 percent, 90 percent, 100 percent, 110 percent and 120 percent and were discharged at about 1 hour rate electric current.

Figure 7:
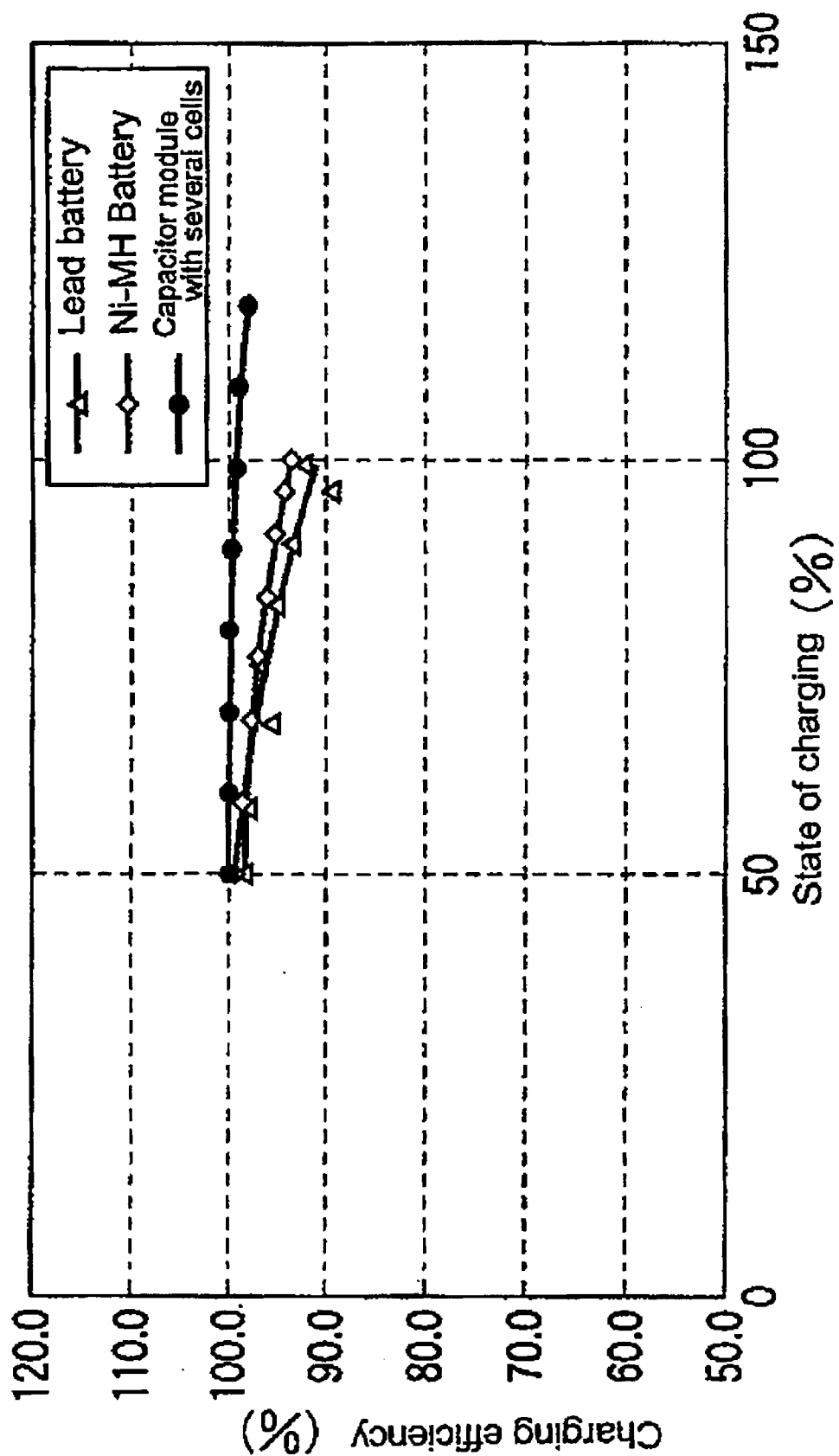
FIG. 7 is a graph showing an experiment of charging effectiveness of a lead battery, Ni—MH battery, and capacitor unit with several connected modules.

The result is shown in Table 7. An axis of abscissas in FIG. 7 shows the state of charge charged under 20–25 degree (Celsius) at 100 minute rate relative to the amount of discharging of each battery while an axis of ordinate shows the state of charge charged at 100 minute rate relative to the amount of discharging. As is apparent from FIG. 7, the capacitor unit with several connected modules shows an excellent state of charge comparing to the lead battery and Ni—MH battery, which is very effective. Especially, as the state of charge increases, the charging efficiency of the capacitor unit with several connected modules improves comparing to other type of batteries.

<I>Irregularity testing of each cell of the capacitor unit with several connected modules Charging-discharging cycle test is conducted relative to the lead battery, Ni—MH battery, capacitor unit with several connected modules without a bypass circuit, and capacitor unit with several connected modules with the bypass circuit made for a 42V vehicle. If 1 cycle include discharging of 1.0 second at 1/100 time ratio, discharging of 60.0 seconds at 1 hour ratio and charging of 160.0 second at 1 hour ratio, the irregularity $\Delta SOC$ of the state of charge is determined from the difference between the maximum value among the state of charge of each cell and the average value of the state of charge of the cells except for the cell with the maximum charging value by discharging each cell at every 1000 cycle. Then, each cell is charged for the same electric amount as the amount of discharging and the charging-discharging cycle is repeated.

Figure 8:
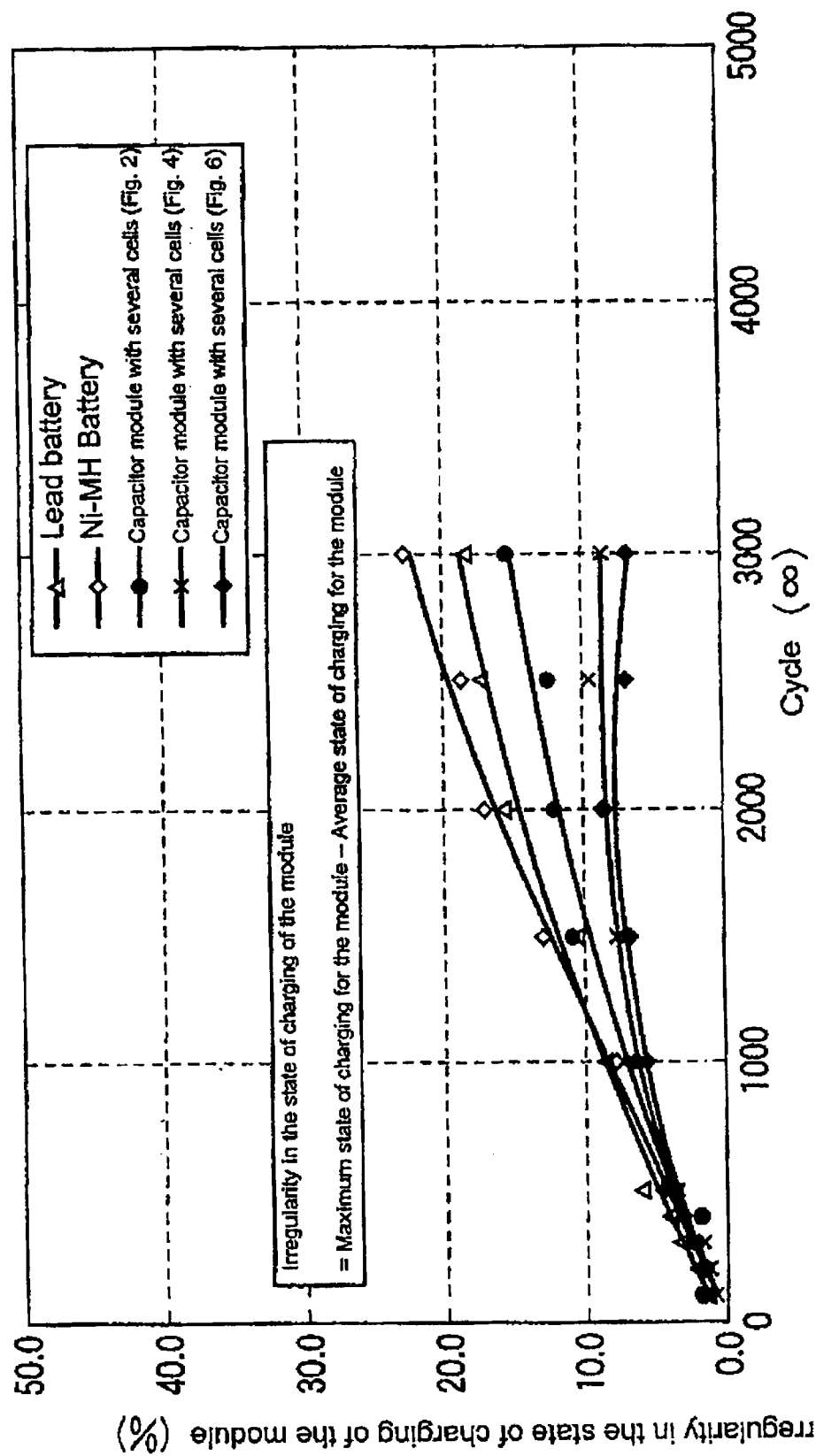
FIG. 8 is a graph showing an experiment of irregularity in state of charge of a lead battery, Ni—MH battery, and capacitor unit with several connected modules.

The result is shown in Table 8. The irregularity of the state of charge $\Delta SOC$ relative to the cycles is shown in FIG. 8. FIG. 8 shows less irregularity in the state of charge of the capacitor without bypass circuit than lead battery and Ni—MH battery. Further, as seen in FIG. 8, the capacitor unit with several connected modules with bypass circuit shows less irregularity than the capacitor unit with several connected modules without bypass circuit, which shows more effective result given by the bypass circuit.

Implementations as described above, render the following advantages:

Implementations provide a capacitor system suitable for charging and discharging of a vehicle such as discharging due to starting of an engine, charging by the alternator, and recharging upon braking.

Further, implementations provide a capacitor system for a vehicle with an excellent durability.

Still further, implementations provide a capacitor system for a vehicle with less irregularity in the state of charge of the module of the capacitor unit with several connected modules.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What we claim is:

1. A capacitor system for a vehicle with a power source discharging upon starting an engine, charging by an alternator, or recharging upon braking, said power source is a capacitor unit with several connected modules in which ion conductive materials are arranged between a pair of electrode structures with large surface area materials and an electric double layer is formed between the large surface area materials in the electrode structure and an electrolyte of the ion conductive materials, wherein charging and discharging are controlled for a state of charge of the capacitor unit with several connected modules to be within a predetermined range; and a minimum charge within the predetermined range is sufficient for the engine to start while a maximum charge within the predetermined range is within rated voltage of the capacitor unit with several connected modules.

2. The capacitor system for a vehicle according to claim 1, wherein if the state of charge of the capacitor unit with several connected modules becomes lower than a predetermined range, discharging other than for starting the engine is inhibited.

3. The capacitor system for a vehicle according to claim 1, wherein if a state of charge of the capacitor unit with several connected modules becomes higher than a predetermined range after conducting one recharging operation upon braking, any type of charging is inhibited; and if the state of charge of the capacitor unit with several connected modules becomes higher than the predetermined range after a predetermined number of recharging, alternator charging is inhibited and recharging only is conducted.

4. The capacitor system for a vehicle according to claim 1 wherein the capacitor unit with several connected modules is configured such that plural modules of electrical double layer capacitor cells are arranged in series; the respective bypass circuit is arranged between the modules; charging of one or more high-charged modules is interrupted by use of the bypass circuit; and state of charges of all modules are controlled to be equalized.

5. A capacitor system for a vehicle with a power source discharging upon starting an engine, charging by an alternator, or recharging upon braking, said power source is the capacitor unit with several connected modules in which ion conductive materials are arranged between a pair of electrode structures with large surface area materials and an electric double layer is formed between the large surface area materials in the electrode structure and an electrolyte of the ion conductive materials, wherein charging and discharging are controlled for a state of charge of the capacitor unit with several connected modules to be 50–99 percent provided that the state of charge of the capacitor unit with several connected modules at rated voltage is 100 percent.

6. The capacitor system for a vehicle according to claim 5, wherein if a state of charge of the capacitor unit with several connected modules becomes higher than 99 percent, any type of charging is inhibited; and if the state of charge of the capacitor unit with several connected modules is 90–99 percent, alternator charging is inhibited and recharging only is conducted.

7. The capacitor system for a vehicle according to claim 5 wherein the capacitor unit with several connected modules is configured such that plural modules of electrical double layer capacitor cells are arranged in series; the respective bypass circuit is arranged between the modules; charging of one or more high-charged modules is interrupted by use of the bypass circuit; and state of charges of all modules are controlled to be equalized.

8. The capacitor system for a vehicle according to claim 7, wherein if irregularity in the state of charges among the modules becomes more than a predetermined range, charging of one or more high-charged modules is interrupted; and state of charges of all modules are controlled to be equalized.

9. The capacitor system for a vehicle according to claim 1, wherein a power terminal is extended from an electric double layer capacitor cell terminal and the power is directly driven therefrom.

10. A capacitor system for a vehicle with a power source discharging upon starting an engine, charging by an alternator, or recharging upon braking, said power source comprises a capacitor unit with several connected modules in which ion conductive materials are arranged between a pair of electrode structures with large surface area materials and an electric double layer is formed between the large surface area materials in the electrode structure and an electrolyte of the ion conductive materials; and a control unit controlling the capacitor unit with several connected modules to be within a state of charge between a minimum charge sufficient for the engine to start and a maximum charge without exceeding rated voltage of the capacitor unit.

11. The capacitor system for a vehicle according to claim 10, wherein the system further comprises a control unit which inhibits discharges other than for starting the engine if the state of charge of the capacitor unit with several connected modules becomes lower than the minimum charge sufficient for the engine to start.

12. The capacitor system for a vehicle according to claim 10, wherein if a state of charge of the capacitor unit with several connected modules becomes higher than the rated voltage of the capacitor unit with several connected modules after conducting one recharging operation upon braking, any type of charging is inhibited; and if the state of charge of the capacitor unit with several connected modules becomes higher than the rated voltage of the capacitor unit with several connected modules after a predetermined number of recharging, alternator charging is inhibited and recharging only is conducted.

* * * * *